United States Patent
Rogers et al.

(10) Patent No.: US 8,991,264 B2
(45) Date of Patent: Mar. 31, 2015

(54) INTEGRALLY MOLDED MAGNETIC FLOWMETER

(71) Applicant: Rosemount Inc., Chanhassen, MN (US)

(72) Inventors: Steven Bruce Rogers, Minnetonka, MN (US); Joseph Alan Smith, Minneapolis, MN (US)

(73) Assignee: Rosemount Inc., Chanhassen, MN (US)

( * ) Notice: Subject to any disclaimer, the term of this patent is extended or adjusted under 35 U.S.C. 154(b) by 93 days.

(21) Appl. No.: 13/627,446

(22) Filed: Sep. 26, 2012

(65) Prior Publication Data

US 2014/0083200 A1    Mar. 27, 2014

(51) Int. Cl.
    G01F 1/58        (2006.01)
(52) U.S. Cl.
    CPC ............... *G01F 1/584* (2013.01); *G01F 1/588* (2013.01)
    USPC ..................................................... 73/861.12
(58) Field of Classification Search
    USPC ................ 73/861.08, 861.12, 861.11, 861.17
    See application file for complete search history.

(56) References Cited

U.S. PATENT DOCUMENTS

| | | | |
|---|---|---|---|
| 3,528,289 A | 9/1970 | Schwartzman | |
| 3,712,133 A | 1/1973 | Westersten | |
| 4,098,118 A | 7/1978 | Schmoock | 73/861.12 |
| 4,125,019 A | 11/1978 | Cushing | 73/861.12 |
| 4,181,018 A | 1/1980 | Schmoock | 73/861.12 |
| 4,214,477 A | 7/1980 | Schmoock | 73/861.12 |
| 4,253,340 A | 3/1981 | Schmoock | 73/861.12 |
| 4,358,963 A | 11/1982 | Schmoock | 73/861.12 |
| 4,388,834 A | 6/1983 | Schmoock | 73/861.12 |
| 4,420,982 A | 12/1983 | Schmoock | 73/861.12 |
| 4,459,857 A | 7/1984 | Murray et al. | |
| 4,497,212 A | 2/1985 | Schmoock | 73/861.12 |
| 4,565,619 A | 1/1986 | Gardner et al. | 204/400 |
| 4,567,775 A | 2/1986 | Schmoock | 73/861.12 |
| 4,716,649 A | 1/1988 | Bittner et al. | 29/602.1 |

(Continued)

FOREIGN PATENT DOCUMENTS

| | | |
|---|---|---|
| DE | 10 2009 002053 A1 | 10/2010 |
| EP | 0 418 033 | 3/1991 |

(Continued)

OTHER PUBLICATIONS

Notification of Transmittal of the International Search Report and the Written Opinion of the International Searching Authority, or the Declaration dated Dec. 5, 2013 in related International Appln. No. PCT/US2013/058911.

(Continued)

*Primary Examiner* — Jewel V Thompson
(74) *Attorney, Agent, or Firm* — Westman, Champlin & Koehler, P.A.

(57) ABSTRACT

A magnetic flowmeter for measuring flow rate of a process fluid, includes a magnetic coil arranged to apply a magnetic field to the process fluid. A pair of electrodes are electronically coupled to the process fluid and arranged to sense a voltage induced in the process fluid related to the applied magnetic field and the flow rate of the process fluid. A molded flow tube of a non-conductive material is arranged to receive a flow of the process fluid. The flow tube is molded around the magnetic coil and the pair of electrodes and is configured to support the magnetic coil and the pair of electrodes. Flow meter circuitry is configured to apply a current to the magnetic coil and receive the resultant voltage sensed by the pair of electrodes.

24 Claims, 5 Drawing Sheets

(56) References Cited

U.S. PATENT DOCUMENTS

| | | |
|---|---|---|
| 4,726,236 A | 2/1988 | Wada |
| 4,736,635 A | 4/1988 | Murase |
| 4,774,844 A | 10/1988 | Davis .................. 73/861.12 |
| 5,121,640 A | 6/1992 | van der Pol |
| 5,263,374 A | 11/1993 | Marsh .................. 73/861.15 |
| 5,280,727 A | 1/1994 | Hafner et al. .............. 73/861.12 |
| 5,316,035 A | 5/1994 | Collins et al. .................. 137/312 |
| 5,449,017 A | 9/1995 | Collins et al. .................. 137/312 |
| 5,551,306 A | 9/1996 | Scarpa |
| 5,670,724 A | 9/1997 | Batey .................. 73/861.12 |
| 5,866,823 A | 2/1999 | Scarpa |
| 5,880,376 A * | 3/1999 | Sai et al. ................... 73/861.08 |
| 6,237,424 B1 * | 5/2001 | Salmasi et al. .............. 73/861.17 |
| 6,539,981 B1 | 4/2003 | Kleven et al. .................. 138/143 |
| 6,865,956 B2 | 3/2005 | Yamamoto |
| 7,155,983 B2 | 1/2007 | Wehrs et al. .............. 73/861.12 |
| 7,293,468 B2 * | 11/2007 | Ishikawa .................. 73/861.12 |
| 7,343,817 B2 | 3/2008 | Wehrs et al. .............. 73/861.12 |
| 7,426,874 B2 | 9/2008 | Yamamoto |
| 7,434,478 B2 | 10/2008 | Yamamoto |
| 7,546,212 B2 | 6/2009 | Schrag et al. ................... 702/45 |
| 7,861,603 B2 | 1/2011 | Takayanagi .............. 73/861.355 |
| 7,866,337 B2 | 1/2011 | Chinnock et al. .......... 137/487.5 |
| 7,921,734 B2 * | 4/2011 | Foss et al. .................. 73/861.12 |
| 7,992,451 B2 * | 8/2011 | Ehrenberg et al. ......... 73/861.12 |
| 2003/0097882 A1 | 5/2003 | Schlosser et al. ........ 73/861.355 |
| 2004/0060366 A1 | 4/2004 | Yamamoto .................. 73/861.12 |
| 2006/0095217 A1 | 5/2006 | Coursolle et al. ................ 702/49 |
| 2006/0213285 A1 | 9/2006 | Thai et al. .................. 73/861.12 |
| 2007/0225922 A1 | 9/2007 | Foss et al. ........................ 702/45 |
| 2008/0078252 A1 | 4/2008 | Graber et al. .............. 73/861.16 |
| 2008/0258736 A1 | 10/2008 | Schulz et al. .................. 324/537 |
| 2009/0188327 A1 | 7/2009 | Shanahan .................. 73/861.08 |
| 2010/0024568 A1 | 2/2010 | Diederichs .................. 73/861.12 |
| 2010/0107776 A1 | 5/2010 | Shanahan .................. 73/861.11 |
| 2010/0132479 A1 | 6/2010 | van Willigen |
| 2010/0224008 A1 | 9/2010 | Foss et al. .................. 73/861.12 |
| 2010/0275701 A1 | 11/2010 | Foss et al. .................. 73/861.12 |

FOREIGN PATENT DOCUMENTS

| | | |
|---|---|---|
| GB | 990 484 | 4/1965 |
| GB | 2 081 449 A | 2/1982 |

OTHER PUBLICATIONS

First Office Action for Chinese patent application No. 201220694833.9, dated Apr. 8, 2013, 5 pages.

Notification of Transmittal of the International Search Report and Written Opinion of the International Searching Authority, or the Declaration of PCT/US2013/058472, dated Feb. 5, 2014.

Office Action from U.S. Appl. No. 13/627,404, dated Jul. 22, 2014.

\* cited by examiner

INTEGRALLY MOLDED MAGNETIC FLOWMETER

CROSS-REFERENCE TO CO-PENDING APPLICATION

In one specific configuration, four coils are employed such as those illustrated in co-pending application Ser. No. 13/627,404, titled MAGNETIC FLOWMETER WITH MULTIPLE COILS, by, Steven B. Rogers, filed on Sep. 26, 2012, and commonly assigned with the instant application.

BACKGROUND

The present invention relates to flowmeters of the type used to sense and measure flow of a process fluid in industrial process plants. More specifically, the present invention relates to measurement of flow using a magnetic flow meter.

Magnetic flowmeters are generally used to measure flow of a conductive process fluid through an electrically-insulated flow tube. In accordance with Faraday's law of electromagnetic induction, when the conductive process fluid moves in a perpendicular direction through a magnetic field, a voltage is induced in the fluid that is proportional to the velocity of the process fluid and the strength of the applied magnetic field. The magnetic field can be created by applying a current to a coil made out of a wire that has been bent into multiple, closely-spaced loops. A pair of electrodes is then used to measure the voltage induced by the movement of the process fluid.

Many flowmeters require a rigid flow tube (such as metal) to provide the strength needed in high pressure applications. In many instances, the placement and arrangement of the electrodes and magnetic coils is difficult and time consuming during manufacture. Additional metal components, such as the metal flow tube, can result it magnetic eddy current losses between the magnetic coils and the process fluid. Further, the positioning and placement of the coils and electrodes may require various bonding steps including welding.

SUMMARY

A magnetic flowmeter for measuring flow rate of a process fluid, includes a magnetic coil arranged to apply a magnetic field to the process fluid. A pair of electrodes are electronically coupled to the process fluid and arranged to sense a voltage induced in the process fluid related to the applied magnetic field and the flow rate of the process fluid. A molded flow tube of a non-conductive material is arranged to receive a flow of the process fluid. The flow tube is molded around the magnetic coil and the pair of electrodes and is configured to support the magnetic coil and the pair of electrodes. Flow meter circuitry is configured to apply a current to the magnetic coil and receive the resultant voltage sensed by the pair of electrodes.

DETAILED DESCRIPTION OF ILLUSTRATIVE EMBODIMENTS

The present invention provides a magnetic flowmeter for use in measuring flow of a conductive process fluid in an industrial process. In one aspect, the invention allows coils and electrodes in the flowmeter to be arranged as desired, and provides pressure containment using a molded flow tube configuration. In a specific embodiment, this is provided in what is known as a "wafer" style flow tube in which the flow tube is secured between two flanges at the opposed ends of two process pipes.

In one example, the coils, electrodes, and their associated wiring are all molded or cast into a solid polymer molded tube or "ring" arranged in a "donut" shape which can then be installed between the two process flanges of a pipeline. A particular polymer can be chosen as desired based upon pressure of the process fluid, the size of the orifice, the ease of molding, etc. In some configurations, an additional material can be used to provide structural reinforcement. For example, a "back-up ring" of metal or other material can extend around the outside circumference of the polymer tube. This can assist in pressure containment and provide additional stability to the polymer tube. Example metals that can be used include stainless steel or carbon steel. Carbon steel, as well as other material, has the advantage of providing a magnetic return path for the magnetic field. The polymer ring itself may comprise, for example, polyurethane, PFA, non-conductive polyphenylene sulfide and potentially may include conductive polyphenylene sulfide electrodes. Commercially, polyphenylene sulfide is known under the trade names Ryton® and Techtron®. In general, any combination of electrodes, including conductive polymer electrodes, along with non-conductive polymers may be used to implement the invention.

These configurations provide various advantages including the partial or complete elimination of a stainless steel pipe for pressure containment, the potential elimination of welded or other machined housing outside of the coils, the reduction in magnetic eddy current losses between the coil and the process fluid and a general simplification in the manufacturing process in which the electrodes, coils and associated wires are simply assembled into a mold and then a polymer is injected or poured into the mold. In one specific configuration, four coils are employed such as those illustrated in co-pending application Ser. No. 13/627,404, titled MAGNETIC FLOWMETER WITH MULTIPLE COILS, by, Steven B. Rogers, filed on Sep. 26, 2012, and commonly assigned with the instant application.

According to one embodiment, the magnetic flowmeter includes a flow tube arranged to receive the flow of the process fluid. Further, the flowmeter preferably includes a plurality of coils arranged adjacent the flow tube. A controller is configured to apply a magnetic field to the process fluid using the plurality of coils. First and second electrodes are arranged to sense an electrical potential of the process fluid which is related to the applied magnetic field and the flow rate of the process fluid. A sensor is configured to sense a voltage between the first and second electrodes. The controller is configured to calculate the flow of the process fluid based upon the voltage sensed between the first and second electrodes by the sensor.

Figure 1:
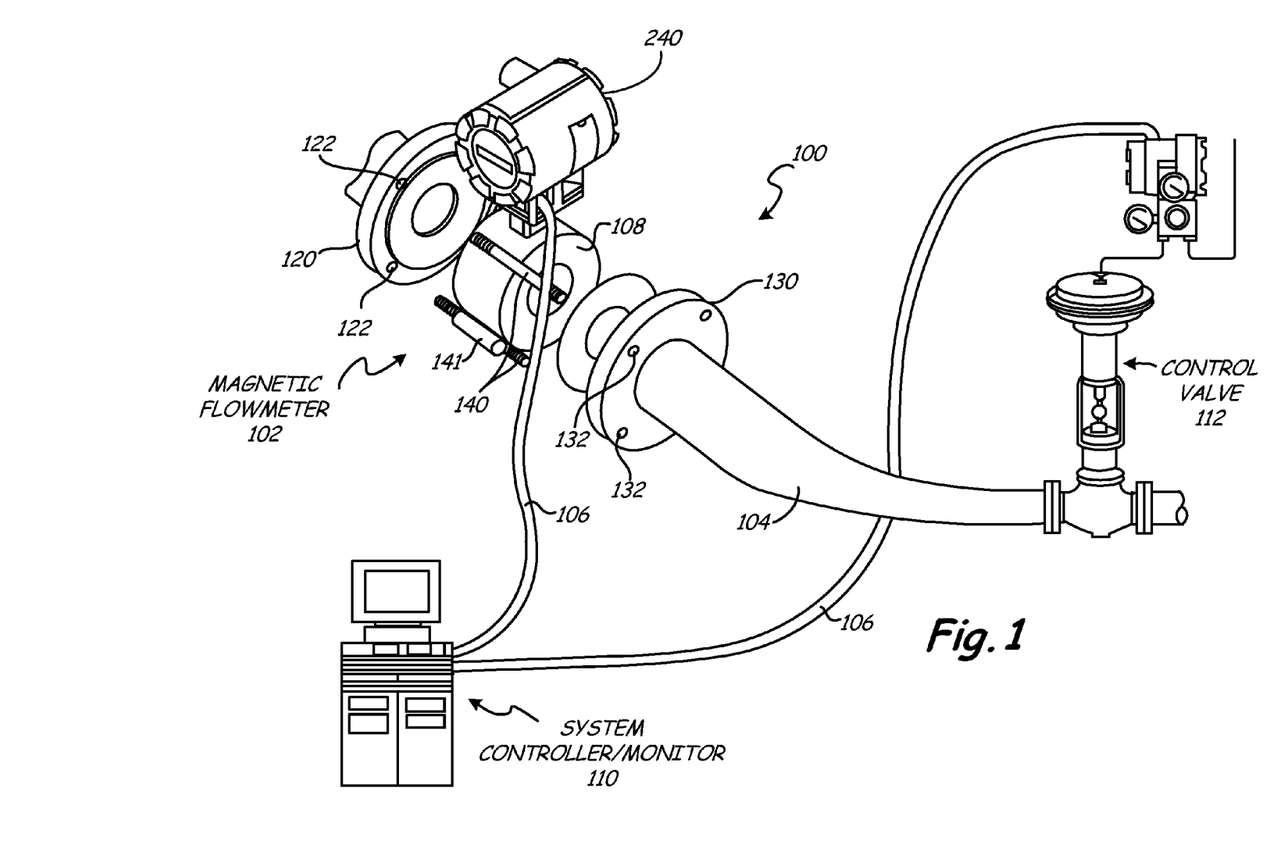
FIG. 1 is a diagram showing a process control system including a magnetic flowmeter.

In FIG. 1, a typical environment for magnetic flowmeter 102 is illustrated at 100. More specifically, FIG. 1 shows the magnetic flowmeter 102 coupled to process piping 104 which also couples to control valve 112. As illustrated in FIG. 1, flow tube 108 of flowmeter 108 is a "wafer" style flow tube in which it is secured between flange 120 and opposed flange 130 of process pipe 104, but does not include flanges of its own. Flanges 120 and 130 include respective bolt holes 122 and 132. Bolts 140 are arranged to be received through holes 122 and 132 to thereby secure the flow tube 108 therebetween. The flow tube may also include sleeves 141 for receiving the bolts there through thereby centering the flow tube 108 between the flanges 120 and 130.

In a magnetic flowmeter, the monitored process variable relates to velocity of the process fluid flowing through flow tube 108. Magnetic flowmeter 102 can be configured to provide an output for transmission over long distances to a controller or indicator, via communication bus 106. In typical processing plants, communication bus 106 can be a 4-20 mA current loop, a fieldbus connection, a pulse output/frequency output, a HART® protocol communication, a wireless communication connection such as WirelessHART® communication protocol in accordance with the IEC 62591 Standard, Ethernet or fiberoptic connection, or other communication channel to a controller such as system controller/monitor 110 or other device. System controller 110 can be programmed as a process monitor, to display flow information for a human operator or as a process controller to control the process using control valve 112 over communication bus 106.

Figure 2:
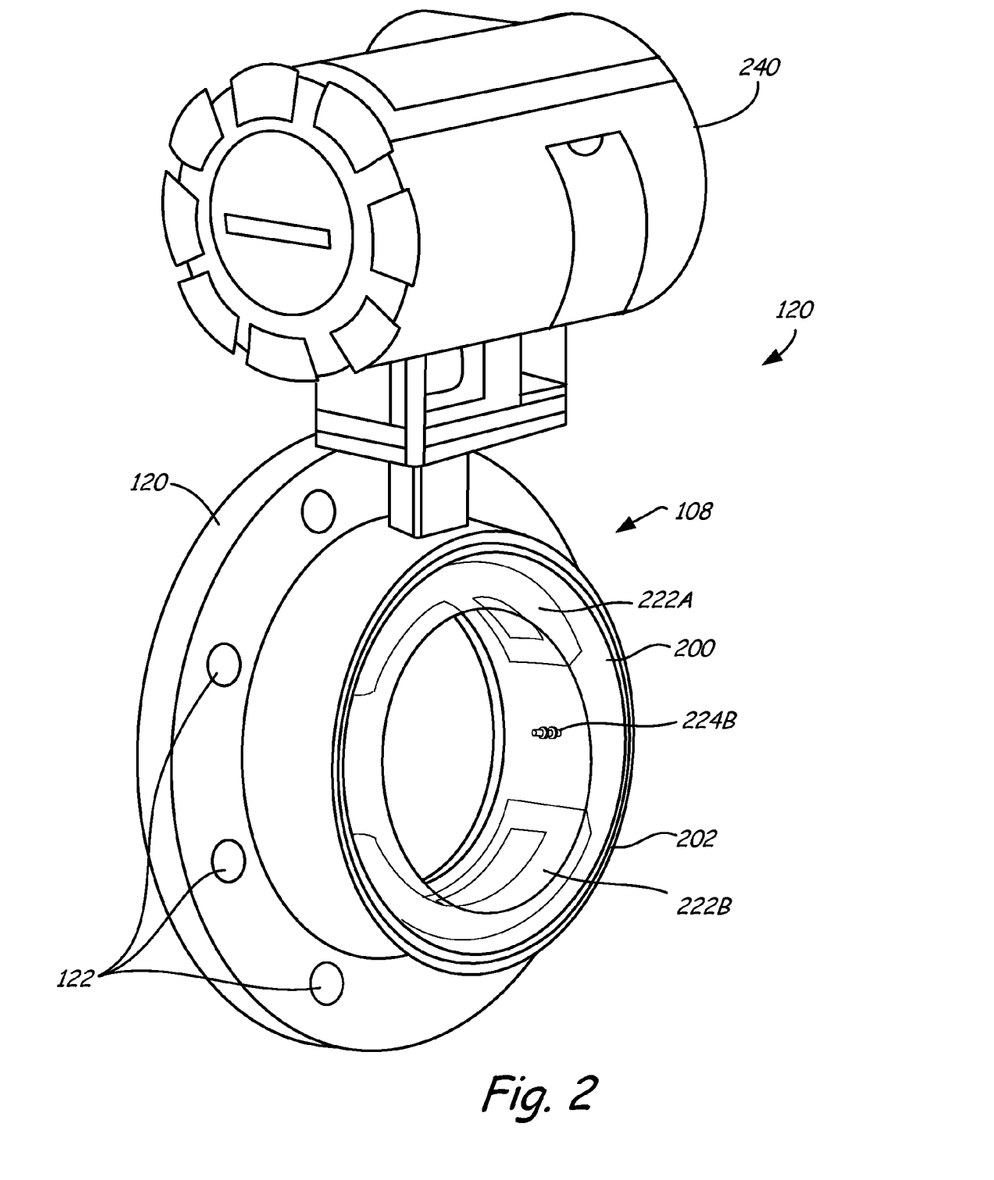
FIG. 2 is a side partial cutaway perspective view of the magnetic flowmeter of FIG. 1.
Figure 3:
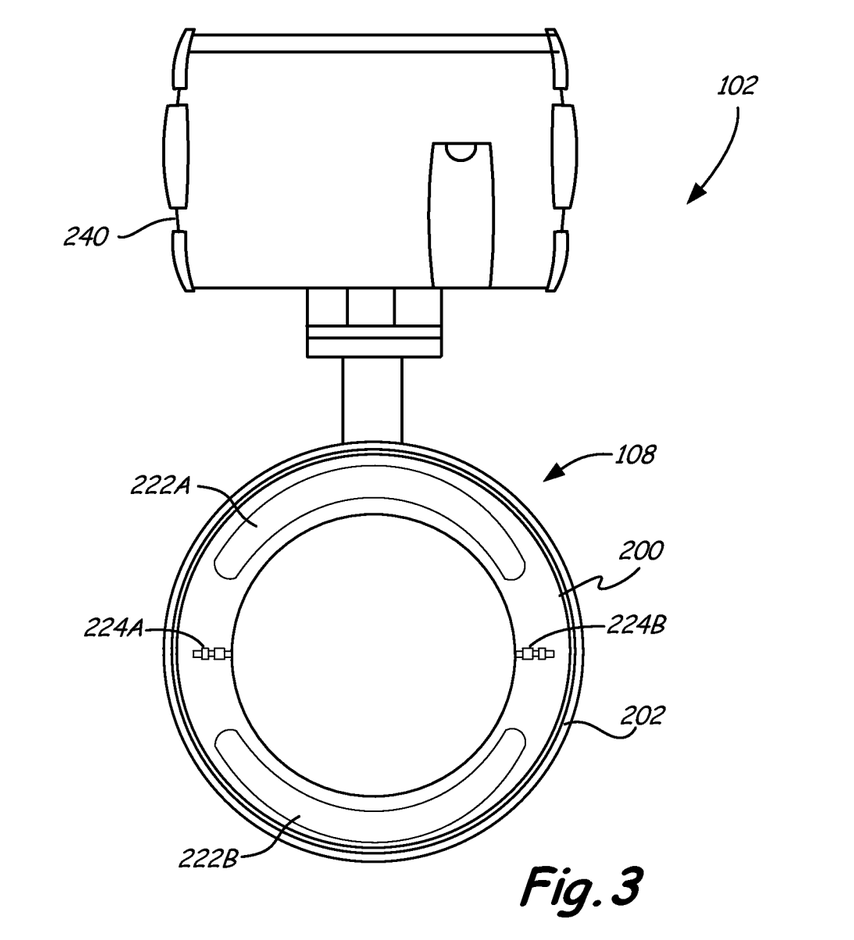
FIG. 3 is a plan partial cutaway view of the magnetic flowmeter of FIG. 1.

FIG. 2 is a partially cut-away perspective view of magnetic flowmeter 102 and FIG. 3 is a partial cut-away front plan view of magnetic flowmeter 102. As illustrated in FIGS. 2 and 3, magnetic flowmeter 102 includes flow tube 108 coupled to electronics housing 240. The flow tube 108 is formed by a ring or tube 200 which carries magnetic coils 222A and 222B therein. The coils 222A and 222B are arranged to direct a magnetic field into the interior of tube 200 whereby the magnetic field is impressed on the process fluid. Electrodes 224A and 224B are arranged in tube 200. Ends of the electrodes 224A and 224B extend at least to the edge of tube 200 whereby the electrodes 224A and 224B are in electrical contact with the process fluid. FIG. 2 also illustrates the magnetic flow tube 108 positioned adjacent flange 120 which includes bolt holes 122. As discussed in connection with FIG. 1, flange 120 and flange 130 are used to secure the magnetic flow tube 108 between sections of piping 104. FIGS. 2 and 3 illustrate coils 222A and 222B as having a saddle or "C" shape. However, the present invention is not limited to this configuration. Further, the present invention is not limited to a configuration with two coils and two electrodes and may employ any number of coils and electrodes as desired. Additionally, an optional exterior support ring 202 can be used as discussed above to provide additional strength. In one example, this support ring 202 comprises a metal. However, the support ring 202 may be formed of other material and may extend partially or completely around the ring 200.

Figure 4A:
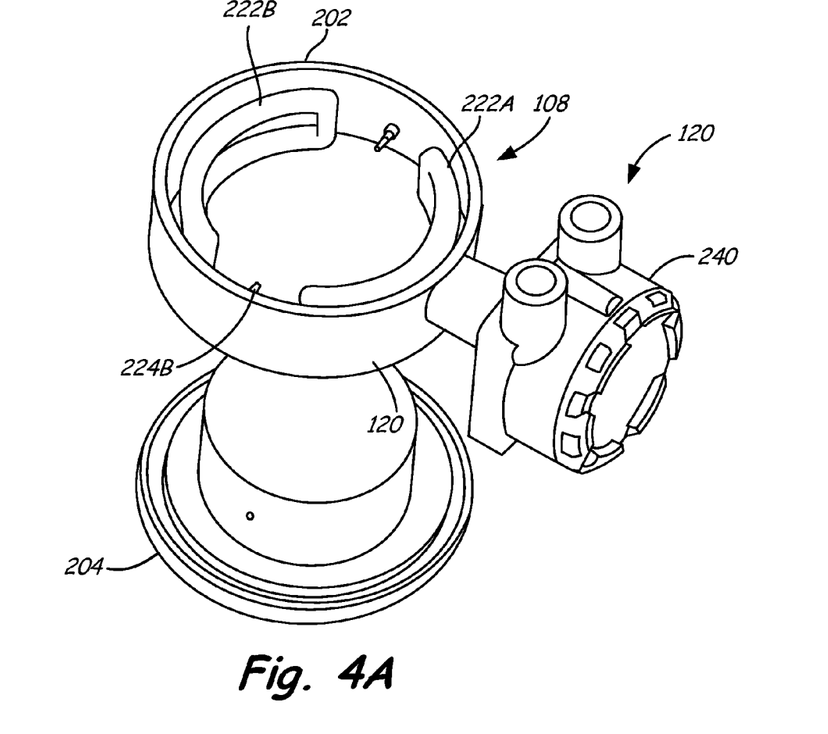
FIG. 4A is an exploded perspective view and FIG. 4B is a perspective view of a mold used to fabricate the flow tube of the magnetic flowmeter of FIG. 1.
Figure 4B:
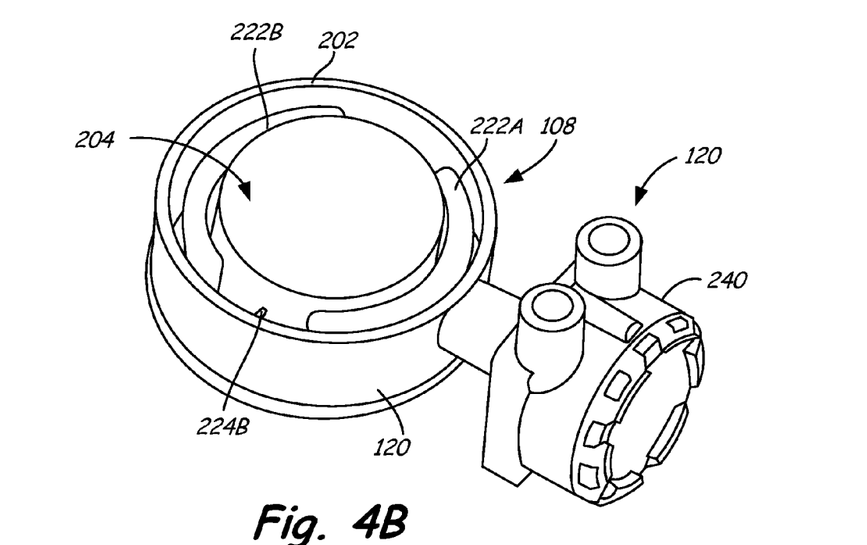

FIGS. 4A and 4B show a molding process in which mold 204 used to form a tube 200. Mold 204 is arranged to allow the flow of liquid polymer into the space formed within mold 204 and ring 202. Prior to filling the space with a polymer, the coils 222A, 222B, electrodes 224A, 224B and their associated wiring may be placed as desired within the space 208 of mold 204. Molding can also be provided to form molded electrodes formed of a conductive polymer. Once the molding material solidifies, the final tube 200 is formed and the mold 204 is removed from the mold and finish as desired. Additional processing may be desired, for example, additional machining or sanding of the ring 200 following the molding process. Note that in FIGS. 4A and 4B, element 240 denotes a junction housing which is used to electrically couple to a transmitter.

Figure 5:
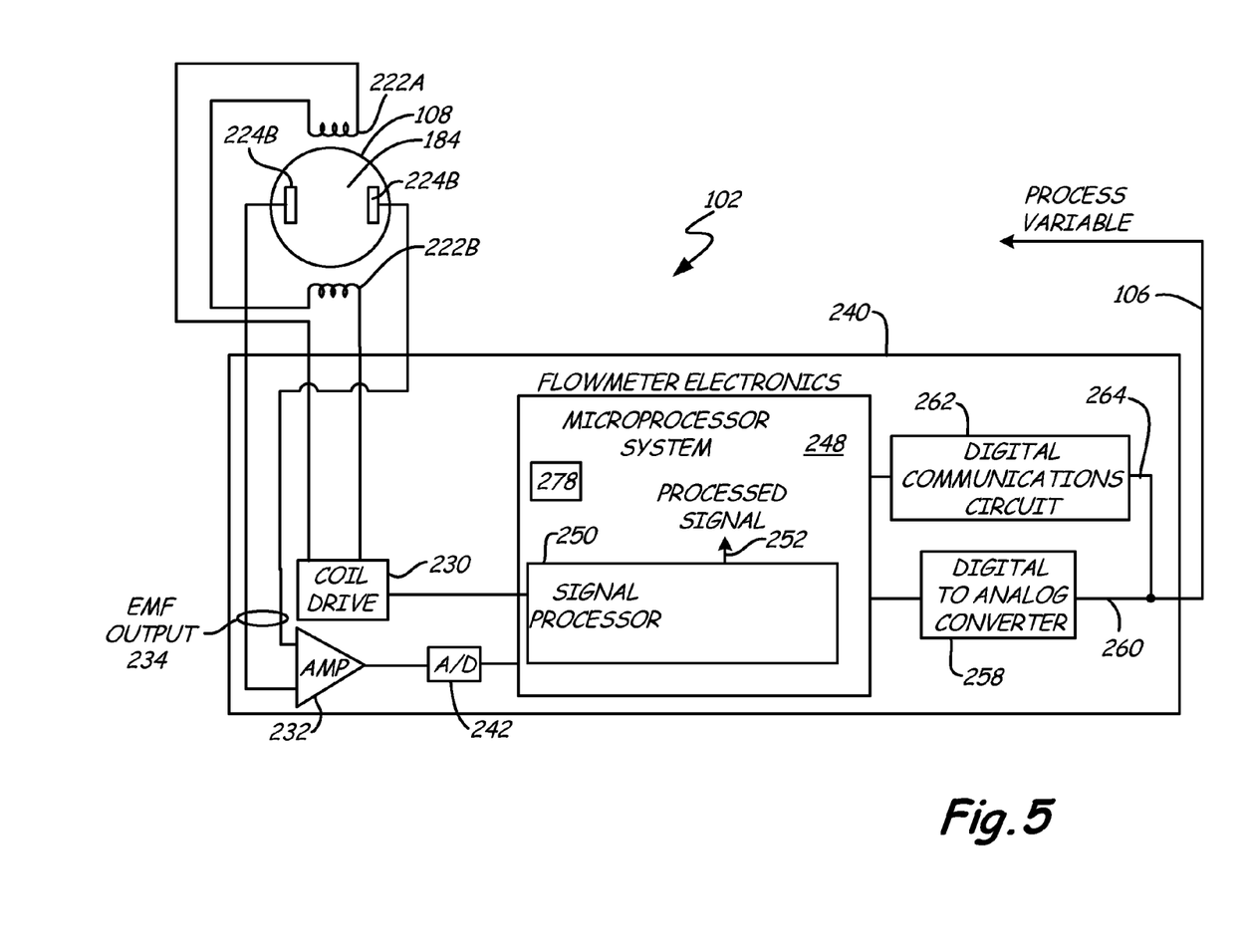
FIG. 5 is a simplified schematic diagram of the magnetic flowmeter of FIG. 1.

In FIG. 5, a block diagram shows one embodiment of magnetic flowmeter 102 for measuring the flow of the conductive process fluid 184 through flow tube 108. Coils 222A, 222B are configured to apply an external magnetic field in the fluid flow in response to an applied drive current from coil driver 230. The coils 222 can be powered either by alternating current (AC) or direct current (DC). Electrodes (EMF sensors) 224A, 224B electrically couple to the fluid flow and provide the EMF signal output 234 to an amplifier 232 related to the EMF generated in the fluid flow due to the applied magnetic field and fluid velocity. Analog to digital converter 242 provides a digitized EMF signal to a controller system 248, which can be a microprocessor or the like. A signal processor 250 is implemented in microprocessor system 248 of flowmeter electronics 240 which couples to the EMF output 234 to provide an output 252 related to fluid velocity. A memory 278 can be used to store program instructions or other information.

Microprocessor system 248 calculates velocity through flow tube 108 in accordance with a relationship between the EMF output 234 and the flow velocity, as set forth in Faraday's law, which states:

$$V = E/(kBD) \tag{1}$$

Where E is the EMF output 234, V is the velocity of the fluid, D is the diameter of the flow tube 108, B is the strength of the magnetic field in the fluid, and k is a constant of proportionality. Microprocessor system 248 calculates flow of the process fluid in accordance with known techniques. A digital to analog converter 258 coupled to the microprocessor system 248 generates an analog transmitter output 260 for coupling to communication bus 106. A digital communication circuit 262 generates a digital transmitter output 264. The analog output 262 generates an analog transmitter output 264.

In one configuration, the magnetic flowmeter of the present invention is configured to adjust for properties of the flanges 120 and 130 (see FIG. 1) between which it is secured. As the flow tube 108 of the present invention does not completely contain the magnetic field, the adjacent flanges may alter the magnetic field based upon the magnetic permeability of the flanges. This may affect the calibration of the flowmeter. For example, if the flanges are carbon steel, the flowmeter will need to be calibrated differently than if they are of stainless steel.

In one aspect, the microprocessor 248 is configured to detect whether the adjacent flanges are of carbon steel or stainless steel. More specifically, the inductance of the magnetic circuit made with the coils 222A and 222B will change. This inductance will be greater when carbon steel flanges are used than if stainless steel flanges are used. The increased inductance may be detected by monitoring a rate of change of the coil current when the polarity of the current is reversed. Higher inductance values will correlate to a slower rate of change. The inductance of the magnetic circuit can be measured during manufacture and the different calibration values stored in the memory of the microprocessor 248. During startup of the flow tube when it is placed in operation, software implemented in microprocessor 248 can be used to measure the inductance of the magnetic circuit and select the appropriate calibration value. This adjustment can be made automatically during startup, or based upon other techniques such as periodically testing or testing based upon a command received over the databus 106.

In an alternative method for detecting the composition of the flanges, the hysteresis of the magnetic circuit may be measured during reversals of the magnetic field. The hysteresis changes if the flanges are made of carbon steel rather than stainless steel, and the microprocessor 248 can analyze the different hysteresis signals and select the appropriate compensation value. In one example, the coils 222A and 222B are driven using a special signal for easier detection of the hysteresis. For example, a higher frequency signal can be applied during a startup of the device in order to make changes in the hysteresis easier to detect.

Although the present invention has been described with reference to preferred embodiments, workers skilled in the art will recognize that changes may be made in form and detail without departing from the spirit and scope of the invention. More specifically, even though embodiments of the present invention have been described as including two coils and two electrodes, the number of coils and electrodes that can be used with the present invention is not limited to those. The coils of the flowmeter may be configured as desired. The coils may be a conical seated, inverted conical seat, labyrinth configuration, etc. Although the description above describes two techniques for selecting the appropriate calibration values, other techniques may be employed including manual selection. In another example, the calibration values are calculated based upon the magnetic properties of the adjacent flanges. For example, the calibration values for the flowmeter may be related to the detected magnetic properties based upon an equation such as a polynomial characterization equation. Similarly, the compensation may be adjusted if a metal ring is used to reinforce the molded flow tube. As used herein, a wafer style flowmeter refers to a flowmeter having a flow tube which does not have flanges at its ends.

What is claimed is:

1. A magnetic flowmeter for measuring flow rate of a process fluid, comprising:
    a magnetic coil arranged to apply a magnetic field to the process fluid;
    a pair of electrodes electronically coupled to the process fluid and arranged to sense a voltage induced in the process fluid related to the applied magnetic field and the flow rate of the process fluid;
    a molded flow tube of a non-conductive material arranged to receive a flow of the process fluid therethrough, the molded flow tube molded to form a tube filled with the non-conductive material such that the non-conductive material is molded around the magnetic coil and the pair of electrodes and configured to support the magnetic coil and the pair of electrodes; and
    flow meter circuitry configured to apply a current to the magnetic coil and receive the voltage sensed by the pair of electrodes.

2. The magnetic flowmeter of claim 1 including a reinforcing structure which extends around the molded flow tube.

3. The magnetic flowmeter of claim 2 wherein the reinforcing structure comprises a ring.

4. The magnetic flowmeter of claim 2 wherein the reinforcing structure comprises metal.

5. The magnetic flowmeter of claim 4 wherein the metal comprises carbon steel.

6. The magnetic flowmeter of claim 4 wherein the metal comprises stainless steel.

7. The magnetic flowmeter of claim 1 wherein the magnetic coil comprises two magnetic coils contained within the molded flow tube and positioned adjacent the process fluid.

8. The magnetic flowmeter of claim 1 wherein the molded flow tube comprises a polymer.

9. The magnetic flowmeter of claim 1 wherein the pair of electrodes comprise conductive polymer electrodes.

10. The magnetic flowmeter of claim 1 wherein the molded flow tube is arranged in a "wafer" style configured to be mounted between two flanges located at ends of adjacent pipe.

11. The magnetic flowmeter of claim 1 wherein the flowmeter circuitry is further configured to detect a presence of magnetic material proximate the molded flow tube.

12. The magnetic flowmeter of claim 11 wherein the flowmeter circuitry detects magnetic material based upon a magnetic inductance.

13. The magnetic flowmeter of claim 11 wherein the flowmeter circuitry detects magnetic material based upon a detected hysteresis.

14. The magnetic flowmeter of claim 11 wherein the flowmeter circuitry selects a calibration value based upon the magnetic material.

15. The magnetic flowmeter of claim 13 wherein the flowmeter circuitry selects a calibration value based upon the detected hysteresis.

16. The magnetic flowmeter of claim 13 wherein the hysteresis is measured with a high frequency signal.

17. The magnetic flowmeter of claim 16 wherein the high frequency signal is applied during a startup phase.

18. A magnetic flowmeter for measuring flow rate of a process fluid, comprising:
    a magnetic coil arranged to apply a magnetic field to the process fluid;
    a pair of electrodes electronically coupled to the process fluid and arranged to sense a voltage induced in the process fluid related to the applied magnetic field and the flow rate of the process fluid;
    a molded flow tube of a non-conductive material arranged to receive a flow of the process fluid therethrough, the molded flow tube molded around the magnetic coil and the pair of electrodes and configured to support the magnetic coil and the pair of electrodes; and
    flowmeter circuitry configured to apply a current to the magnetic coil and receive the voltage sensed by the pair of electrodes, wherein the flowmeter circuitry is further configured to detect a presence of magnetic material proximate the molded flow tube based upon detected hysteresis and wherein the flowmeter circuitry selects a calibration value based upon the detected hysteresis.

19. The magnetic flowmeter of claim 18 wherein the hysteresis is measured with a high frequency signal.

20. The magnetic flowmeter of claim 19 wherein the high frequency signal is applied during a startup phase.

21. A magnetic flowmeter for measuring flow rate of a process fluid, comprising:
    a magnetic coil arranged to apply a magnetic field to the process fluid;
    a pair of electrodes electronically coupled to the process fluid and arranged to sense a voltage induced in the process fluid related to the applied magnetic field and the flow rate of the process fluid;
    a molded flow tube of a non-conductive material arranged to receive a flow of the process fluid therethrough, the molded flow tube molded around the magnetic coil and the pair of electrodes and configured to support the magnetic coil and the pair of electrodes; and
    flowmeter circuitry configured to apply a current to the magnetic coil and receive the voltage sensed by the pair of electrodes, wherein the flowmeter circuitry is further configured to detect a presence of magnetic material proximate the molded flow tube.

22. The magnetic flowmeter of claim 21 wherein the flowmeter circuitry detects magnetic material based upon a magnetic inductance.

23. The magnetic flowmeter of claim 21 wherein the flowmeter circuitry detects magnetic material based upon a detected hysteresis.

24. The magnetic flowmeter of claim 21 wherein the flowmeter circuitry selects a calibration value based upon the magnetic material.

* * * * *